United States Patent Office 2,790,090
Patented Apr. 23, 1957

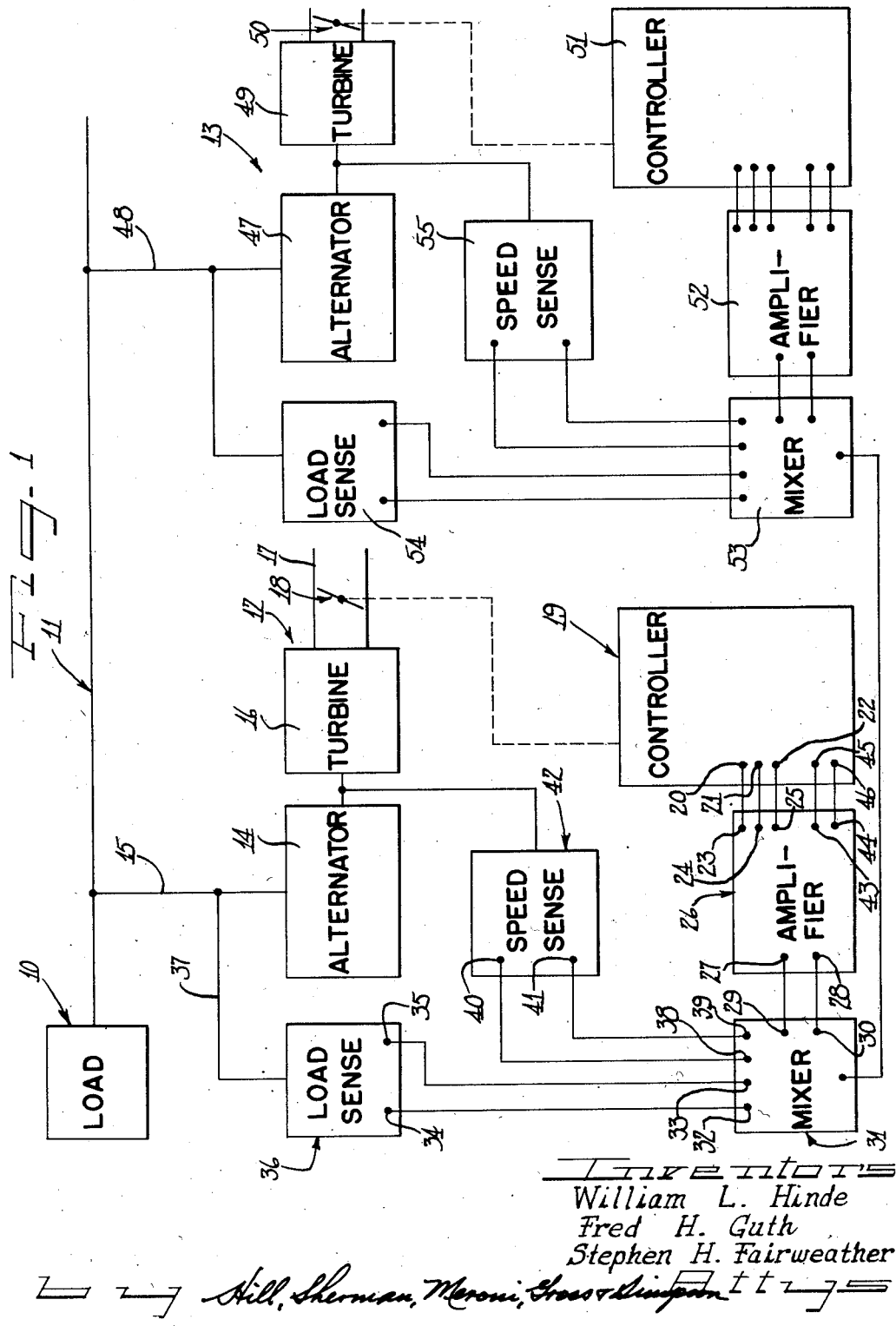

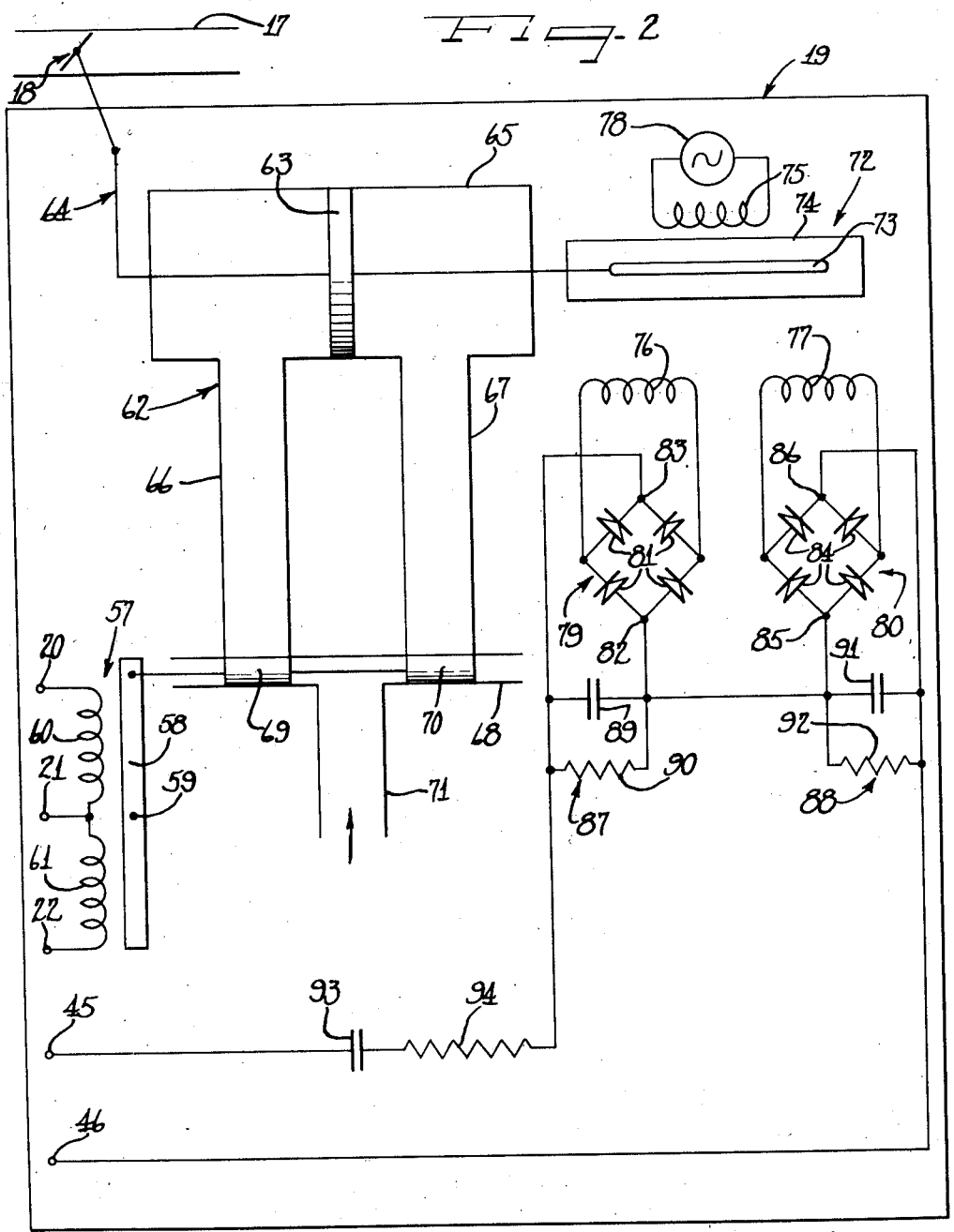

2,790,090

DISPLACEMENT SENSING SYSTEM FOR POWER PLANT CONTROL

William L. Hinde, Euclid, Fred H. Guth, Warrensville Heights, and Stephen H. Fairweather, South Euclid, Ohio, assignors to Thompson Products, Inc., Cleveland, Ohio, a corporation of Ohio Application August 2, 1954, Serial No. 447,360

4 Claims. (Cl. 290—4)

This invention relates to a displacement sensing system and more particularly to a displacement sensing system which is rugged, reliable and efficient and has an extremely fast response so as to be particularly adapted for use in combination with control systems such as aircraft alternator control systems.

In an exemplary application of this invention, a plurality of alternators are installed in an airplane to supply the electrical power required for various devices and apparatus in the airplane. The alternators may, for example, supply 400 cycle, 3-phase power. In normal operation, one alternator may supply sufficient power but the power requirements may at times exceed the capacity of one alternator and it may then be necessary to connect one or more other alternators in parallel therewith. It is, of course, desirable that only one alternator be operated when it can supply sufficient power.

Means are provided for controlling the drive and output of the alternators so that they can be readily operated in parallel and so that a proper load division therebetween can be achieved. Although other methods of control could be utilized, the outputs of the alternators are preferably controlled by controlling the air input to air turbines used to drive the alternators.

For this purpose, a controller may operate a valve in the air intake, the controller having input terminals connected to output terminals of a suitable amplifier such as a thyratron amplifier, an amplidyne or preferably a magnetic amplifier. The amplifier may have an input connected to a mixer which, in turn, is connected both to a load-sensing system for sensing the power output of the alternator and a speed-sensing system for sensing the speed of rotation of the alternator.

With this arrangement, the speed may be an exact function of load and independent of other factors and the relation between speed and load may be such that the alternators can be readily paralleled to achieve a proper load division therebetween. Most preferably, the speed decreases as the load increases to provide what may be termed a "scheduled droop characteristic."

It will be appreciated that with a system of this type, the various elements must be extremely fast in response in order to prevent "hunting" or oscillations, or otherwise unstable operation. This is particularly true when a relatively high frequency such as 400 cycles per second is involved.

This invention is concerned primarily with the controller for controlling the valve in the air intake of the turbine in accordance with signals from the amplifier output and is particularly concerned with a displacement-sensing system utilized in the controller to achieve an optimum response characteristic.

The controller may comprise an electro-mechanical transducer which may directly operate the valve in the input air duct of the turbine but which may preferably control valve means of a fluid-actuated system to control movement of a piston or the like mechanically coupled to the valve.

To improve the speed of response and stability of operation of the system, a displacement-sensing system is provided to sense the displacement of the valve and obtain an electrical output signal varying according to displacement of the valve. This signal may be coupled through amplifier means which controls the electro-mechanical transducer. The last-mentioned amplifier means may preferably be part of the amplifier between the mixer and the electro-mechanical transducer, with the amplifier merely having an additional input. The amplifier means could, however, be separate.

The output of the displacement-sensing system may preferably have a phase or polarity corresponding to the direction of displacement of the valve or other element from a predetermined neutral position and, for this purpose, a signal which increases in magnitude as the element is displaced in one direction may be balanced against a reference signal which is equal thereto when the element is at such predetermined neutral position. Preferably, the reference signal is not fixed but increases as the element is displaced in a direction opposite the aforesaid one direction.

With this arrangement, it is possible to achieve relatively large outputs from the displacement-sensing system and it is also possible to obtain outputs which vary symmetrically with respect to displacement of the valve or element in either direction from its neutral position.

According to a specific feature of the invention, an alternating current is generated which varies in amplitude in accordance with displacement of the valve or element and full wave rectifier means are employed to obtain a uni-directional voltage varying according to displacement of the valve or element. The use of full wave rectifier means is particularly advantageous because it increases the speed of response not only because of rectification of both halves of each cycle but also because the ripple frequency is higher and the amount of filtering required is reduced with a reduced amount of filtering resulting in reduced time lags in the system.

Preferably, the rectifier may be a full wave bridge rectifier, to eliminate the necessity of any center taps or the like, and most preferably, selenium rectifier elements are employed, such elements requiring no filament or heater supplies and being very rugged as well as efficient and reliable in operation.

In the case wherein two signals are developed respectively increasing with displacement of the valve or element in opposite directions, separate rectifier means are preferably employed for each of such signals. This is preferable to combining the signals before rectification because any out-of-phase relation of the signals might then result in inaccurate indications.

In addition to employing separate rectifier means, separate filter means are also employed to prevent any undesirable interaction between the rectifiers and specifically to prevent the return paths for occurrence of one rectifier from being through the other rectifier.

It will be appreciated that while the provision of such filter means is highly desirable, the provision of filter means having long time constants can result in a lag in output and decreased speed of response. It has been determined that there is an optimum time constant for each of the filter means and in particular, the time constant of each filter means should be of the same order of magnitude as the duration of one cycle of the alternating current signal applied to the system.

It has been discovered that while the provision of the means sensing the displacement of the valve and controlling the electro-mechanical transducer in accordance therewith produces a much higher speed of response and hence more stable operation, it can have an undesirable effect in that it might produce an error signal operative on the electro-mechanical transducer in a manner such that the speed of rotation of the alternator is not solely determined by the load but is also determined to a certain extent by the degree of displacement of the valve.

To prevent occurrence of this highly undesirable effect, a differentiating circuit may be provided between the output of the displacement-sensing system and the amplifier input which will instantaneously transmit a signal to the amplifier means on any displacement of the valve, but which will not have any ultimate effect on the speed of rotation of the alternator achieved at any particular load. This differentiating circuit may most preferably comprise a series-connected capacitor which, of course, is very simple and yet achieves the desired result in an optimum fashion.

An object of this invention, accordingly, is to provide an improved displacement-sensing system.

Another object of this invention is to provide an improved displacement-sensing system particularly adapted for use in combination with an alternator control system or the like.

A further object of this invention is to provide an improved displacement-sensing system which is very simple and yet efficient and reliable in operation and which is very rugged and durable, especially adapted for use in systems subjected to shocks and vibrations as in aircraft alternator control systems.

This invention contemplates other objects, features and advantages which will become more fully apparent from the following detailed description taken in conjunction with the accompanying drawings which illustrate a preferred embodiment and in which:

Figure 1 is a schematic diagram illustrating in block form an alternator control system utilizing the displacement-sensing system according to the principles of this invention; and Figure 2 is a schematic diagram illustrating in detail a valve controller used in the system of Figure 1 and incorporating the displacement-sensing system of this invention.

Reference numeral 10 designates a load to which a supply line 11 may be connected with a plurality of alternator systems 12 and 13 for supplying power through the supply line 11 to the load 10. More than two systems may, of course, be employed. This arrangement may be installed, for example, in an airplane and the power supplied may be 3-phase, 400 cycle.

In systems of this type, it is not usually necessary to use all of the alternators all of the time and one alternator alone can oftentime supply the required power. It is therefore desirable to use only the number of alternators required for any particular load and to operate additional alternators only when required. It is also desirable that after the alternators are paralleled, a proper load division between alternators should be maintained.

Means are therefore employed for regulating the operation of each alternator in a manner such that the alternators can be readily paralleled and such that a proper load division between alternators is maintained after they are paralleled.

The alternator system 12 may comprise an alternator 14 connected through a branch supply line 15 to the main supply line 11 and an air turbine 16 for driving the alternator 14, the turbine 16 having an air intake duct 17.

Although other means may be employed for regulating the operation of the alternator 14, its operation is preferably regulated by controlling the air intake to the turbine 16 which may be accomplished through a valve 18 in the duct 17.

A controller 19 is mechanically coupled to the valve 18 and is electrically controlled from signals applied to input terminals 20, 21 and 22 which terminals may be connected to output terminals 23, 24 and 25 of an amplifier 26 which may preferably be a magnetic amplifier.

The amplifier 26 may have input terminals 27 and 28 connected to output terminals 29 and 30 of a mixer 31 which may have a first pair of input terminals 32 and 33 connected to output terminals 34 and 35 of a load-sense system 36 connected through a line 37 to the branch supply line 15. The mixer 31 may also have a second pair of input terminals 38 and 39 connected to terminals 40 and 41 of a speed-sense system 42 arranged to give an output signal indicative of the speed of rotation of the alternator 14.

It might be noted that the amplifier 26 may have a second input at terminals 43 and 44 connected to terminals 45 and 46 on the controller 19 for a purpose which will be described in detail hereinafter.

In the operation of this system, the load-sense system 36 and speed-sense system 42 control the operation of the turbine 16 through the amplifier 26, the controller 19 and valve 18 in a manner such that the speed is a predetermined fixed function of load and independent of any other factor. Preferably, the speed may gradually decrease as the load increases to provide what is termed a "scheduled droop characteristic." With such a characteristic, it is possible to readily parallel a plurality of alternators and the maintenance of a proper load division between alternators is greatly facilitated.

The alternator system 13 may be identical to the system 12 and may comprise an alternator 47 connected to the supply line 11 through a branch supply line 48 and driven by a turbine 49 which is regulated by a valve 50 controlled by a controller 51 which is actuated by amplified signals from an amplifier 52 having an input connected to a mixer 53 which is, in turn, connected to a load-sense system 54 and a speed-sense system 55.

To make possible a more accurate load division between alternators 14 and 47, the regulating means for such alternators may be interconnected as by means of a connection 56 between the mixer 31 and the mixer 53, as diagrammatically illustrated.

Referring now to Figure 2, the controller 19, which may be identical to the controller 51, may comprise an electro-mechanical transducer generally designated by reference numeral 57 which may include an armature 58 of magnetic material pivoted on an axis 59 and coils 60 and 61 adjacent portions of the armature 58 on opposite sides of the axis 59. The coil 60 may be connected between the terminals 20 and 21 while the coil 61 may be connected between the terminals 21 and 22. With this arrangement, by controlling the voltage applied between terminals 20 and 21 relative to the voltage applied between terminals 21 and 22, the torque exerted on the armature 58 may be controlled.

The electro-mechanical transducer 57 might be used to directly control the valve 18. In practice, however, it is preferable to employ fluid-actuated means generally designated by reference numeral 62 controlled by the transducer 57 and arranged to actuate the valve 18.

The fluid-actuated means 62 may comprise a piston 63 mechanically coupled to the valve 18, as through the linkage 64, and movable in a cylinder 65. A pair of passageways 66 and 67 communicate with the interior of the cylinder 65 on opposite sides of the piston 63 and also communicate with spaced portions of a passageway 68 in which a pair of valve members 69 and 70 are disposed. A fluid inlet passageway 71 communicates with the portion of the passageway 68 intermediate the passageways 66 and 67. The valve members 69 and 70 may be coupled together into the armature 58 of the electro-mechanical transducer 57.

In operation, the valve members 69 and 70 may be in a neutral position such as illustrated in which the fluid flow from the inlet passageway 71 to the passageways 66 and 67 is either completely blocked off or else is equalized in a manner such that equal pressures are applied to the opposite sides of the piston 63. By moving the valve members 69 and 70 in one direction as, for example, to the left as viewed in Figure 2, the flow through the passageway 66 from the inlet passageway 71 may be increased while flow from the inlet passageway 71 to the passageway 67 is blocked off so that the piston 63 is driven to the right which may, for example, open the valve 18. Similarly, when the valves 69 and 70 are moved to the right, fluid under pressure from the inlet 71 may flow through the passageway 67 and apply pressure to the right side of the piston 63 to move the same to the left which may, for example, close the valve 18.

Since the valves 69 and 70 are controlled by the armature 58 of the electro-mechanical transducer 57, the position of the valve 18 may be controlled by controlling the voltage applied between the input terminals 20 and 21 relative to the voltage applied between the terminals 21 and 22.

The controller 19 as thus far described is adequate for controlling alternator operation in many types of systems, especially if the speed and load-sense systems have high response speeds. However, it is difficult in practice to obtain an extremely high speed of response with mechanical and fluid arrangements such as the fluid-actuated means 62 and the electro-mechanical transducer 57 and it has been found highly desirable to employ a displacement-sensing arrangement of this invention to improve the speed of response, particularly in systems in which the operating frequency is relatively high, as in aircraft systems operating at 400 cycles per second.

The displacement-sensing system of this invention is indicated generally by reference numeral 72 and is coupled to the piston 63 which, in turn, is coupled through the linkage 64 to the valve 18, to develop a signal between the terminals 45 and 46 responsive to displacement of the valve 18. As previously indicated, the terminals 45 and 46 are connected to a pair of input terminals 43 and 44 of the amplifier 24 which, of course, has an output connected to the electro-mechanical transducer 57. The signal applied to the terminals 43 and 44 is of such polarity as to oppose the input signal and thereby effect integral operation of the system when a signal is applied to the terminals 43 and 44. The integral operation effected by the opposing signal applied to the terminals 43 and 44 occurs during an intermediate portion of the correction cycle. That is, at the outset of a correction cycle the system operates proportionally to provide a quick response. Immediately thereafter the signal appears at the terminals 43 and 44 to provide an integral operation and prevent an overrunning correction signal. Then, as the system approaches its proper operating parameters, the system again returns to a proportional operating system to complete the correction cycle. If desired, of course, a separate amplifier could be used but it has been found more desirable to use an amplifier such as the amplifier 26 having a plurality of inputs.

The displacement-sensing system 72 may comprise an elongated slug 73, which may be of magnetic material, coupled to the piston 63 and guided for movement by means such as a tube 74 of non-magnetic material. In a neutral position of the slug 73, such as the position illustrated, the slug 73 is centered with respect to a coil 75 with one end portion of the slug 73 adjacent a coil 76 and with the other end portion thereof being preferably adjacent a coil 77. The arrangement is such that the mutual coupling between the coil 75 and coil 76 is equal to the coupling between the coil 75 and the coil 77 with the slug 73 in its neutral position but with movement of the slug 73 in one direction as, for example, to the left as viewed in Figure 2, the coupling between coils 75 and 76 will be increased while the coupling between coils 75 and 77 is decreased. Similarly, with movement of the slug 73 to the right, the coupling between coils 75 and 76 will be decreased while the coupling between coils 75 and 77 is increased.

The coil 75 may be coupled to a source of alternating current indicated diagrammatically at reference numeral 78 which source may preferably be derived from the supply line 11. Accordingly, the coils 76 and 77 will have outputs varying in inverse relation with displacement of the slug 73.

The voltages developed across the coils 76 and 77 could be combined directly to obtain a voltage indicative of displacement of the slug 73. However, the phase relation of the voltages developed across the coils 76 and 77 with respect to each other and with respect to the voltage applied to the coil 75 may vary with displacement of the slug 73 and if the voltages were combined directly, it would be difficult to obtain a true reliable indication of the displacement of the slug 73. Further, it has been found desirable to use direct current for control purposes and it is necessary to rectify the voltages obtained from the coils 76 and 77 before they are applied to the amplifier input.

It has therefore been found desirable to employ separate rectifier means 79 and 80 for the voltages developed across the coils 76 and 77. According to a specific feature of the invention, each of the separate rectifier means 79 and 80 may be a full wave rectifier to greatly increase the speed of response.

Each of the rectifier means 79 and 80 is preferably a bridge rectifier, to eliminate the necessity of center taps or the like, and most preferably, each of the rectifier means 79 and 80 comprises selenium rectifier elements connected in a bridge circuit. In particular, the rectifier means 79 may comprise four selenium rectifier elements 81 connected in a bridge circuit to develop an output between circuit points 82 and 83 and the rectifier means 80 may comprise four selenium rectifier elements 84 to develop an output voltage between circuit points 85 and 86.

The outputs of the rectifier means 79 and 80 may be connected in opposed relation by connecting the circuit points 82 and 85 together and by connecting the circuit points 83 and 86 to the terminals 45 and 46, the circuit points 83 and 86 being positive with respect to the circuit points 82 and 85, respectively.

To prevent the current of one of the rectifier means 79 and 80 from flowing through the other, which would very likely produce unsatisfactory results, separate filter means 87 and 88 are connected between the circuit points 82 and 83 and between the circuit points 85 and 86, respectively. The filter means 87 may, for example, comprise a capacitor 89 and a resistor 90 connected in parallel and between the circuit points 82 and 83 and the filter means 88 may comprise a capacitor 91 and a resistor 92 connected in parallel between the circuit points 85 and 86.

The time constants of the filter means 87 and 88 must be long enough to obtain satisfactory combination of the outputs of the rectifier means 79 and 80 and prevent undesirable inner action therebetween but should be short enough to obtain fast response. It has been found that the time constant of each of the filter means 87 and 88 (which is determined by multiplying the capacitance in farads by the resistance in ohms) should be of the same order of magntiude as the duration of one cycle of the frequency applied to the system, at coil 75, which is preferably the frequency of the power supplied by the alternators.

The rectified and filtered voltage developed between the circuit points 83 and 86 could be applied directly to the input of the amplifier means and would provide the desired fast response of the controller. However, this voltage is dependent on the displacement of the slug 73 which, in turn, is dependent on the position of the valve 18 and if it were applied directly to the amplifier means, the drive of the alternator would be determined not only by the speed and load but also by the position of the valve 18. This, of course, would be undesirable.

It has been found that such an undersirable effect can be obviated by making the input to the amplifier means (at terminals 43 and 44) dependent only on sudden changes of the valve 18 and independent of the position of the valve 18 after it has been in a given position for a substantial length of time.

In particular, a differentiating circuit may be provided between the circuit points 83 and 86 and the amplifier input which may preferably be defined by a capacitor 93 in series between the circuit point 83 and the terminal 45. Since the voltage across a capacitor cannot change instantaneously, a change in the voltage between the circuit points 83 and 86 will be applied instantaneously to the input terminals of the amplifier. However, after a certain length of time, the charge on the capacitor can change so that the ultimate voltage applied to the amplifier input will be zero.

As previously indicated, the amplifier 26 may be a magnetic amplifier and may have a relatively low impedance between the input terminals 43 and 44. The time constant of the differentiating circuit is, of course, determined by such impedance and by the capacitance of the capacitor 93. If desired, a resistor 94 may be connected in series with the capacitor 93 to decrease the output and increase the time constant, and obtain optimum efficiency of operation.

It may be noted that in the case wherein the amplifier means has an extremely high input impedance, it will sometimes be desirable to connect a resistance between the terminals 45 and 46 so that the required time constant of the differentiating circuit may be achieved with a capacitor 93 having appreciable capacitance, and to stabilize the operation of the circuit.

It may also be noted that as used herein, the phase "of the same order of magnitude" as a given quantity means between 0.1 and 10 times such quantity.

It will be understood that modifications and variations may be effected without departing from the spirit and scope of the novel concepts of the present invention.

We claim as our invention:

1. In a displacement-sensing system for sensing displacement of an element, first means for generating an alternating current signal which increases as the element is displaced in one direction, second means for generating an alternating current signal which increases as the element is displaced in an opposite direction, separate rectifier means for rectifying said alternating current signals to obtain unidirectional voltages equal when the element is at a predetermined neutral position, means comparing said uni-directional voltages to obtain an output corresponding in polarity and magnitude with the direction and magnitude of displacement of the element from said neutral position, and separate filter means at the outputs of said rectifier means each having a time constant of the same order of magnitude as the duration of one cycle of said alternating current signals.

2. In a system including a plurality of alternators connected to a common load, air turbine means for driving each alternator and means for regulating the drive of each alternator including a valve in the air intake of the alternator, fluid-actuated means for controlling the valve, electro-mechanical transducer means for controlling the fluid-actuated means, amplifier means connected to the transducer means and having an input, and speed and load-sensing means connected to the amplifier input, means responsive to displacement of said valve for developing a pair of outputs each increasing and decreasing as the valve moves in opposite directions, a pair of rectifiers connected to said pair of outputs for developing uni-directional voltage outputs, a pair of terminals, means connecting said output voltages to said terminals in opposed relation, and amplifier means between said terminals and said electro-mechanical transducer.

3. In a system including a plurality of alternators connected to a common load, air turbine means for driving each alternator and means for regulating the drive of each alternator including a valve in the air intake of the alternator, fluid-actuated means for controlling the valve, electro-mechanical transducer means for controlling the fluid-actuated means, amplifier means connected to the transducer means and having an input, and speed and load-sensing means connected to the amplifier input, means responsive to displacement of said valve for developing a pair of outputs each increasing and decreasing as the valve moves in opposite directions, a pair of full wave selenium bridge rectifiers connected to said pair of outputs for developing uni-directional voltage outputs, a pair of terminals, means connecting said output voltages to said terminals in opposed relation, and amplifier means between said terminals and said electro-mechanical transducer.

4. In a system including a plurality of alternators connected to a common load, air turbine means for driving each alternator and means for regulating the drive of each alternator including a valve in the air intake of the alternator, fluid-actuated means for controlling the valve, electro-mechanical transducer means for controlling the fluid-actuated means, amplifier means connected to the transducer means and having an input, and speed and load-sensing means connected to the amplifier input, means responsive to displacement of said valve for developing a pair of outputs each increasing and decreasing as the valve moves in opposite directions, a pair of rectifiers connected to said pair of outputs for developing uni-directional voltage outputs, a pair of terminals, means connecting said output voltages to said terminals in opposed relation, amplifier means for controlling said electro-mechanical transducer and having an input, and means connecting said pair of terminals to said input of said amplifier means including a series capacitor.

References Cited in the file of this patent

UNITED STATES PATENTS

| | | |
|---|---|---|
| Re. 17,161 | Innes | Dec. 11, 1928 |
| 2,040,014 | Moseley | May 5, 1936 |
| 2,408,070 | Hull | Sept. 24, 1946 |
| 2,451,263 | Webb | Oct. 12, 1948 |
| 2,504,708 | Watson et al. | Apr. 18, 1950 |
| 2,615,658 | Young | Oct. 28, 1952 |
| 2,662,540 | Rutherford | Dec. 15, 1953 |